United States Patent
Rick et al.

(10) Patent No.: US 6,738,438 B2
(45) Date of Patent: May 18, 2004

(54) PARAMETER ESTIMATOR WITH DYNAMICALLY VARIABLE SEARCH WINDOW SIZE AND/OR PLACEMENT

(75) Inventors: Roland R. Rick, San Diego, CA (US); Borislav Ristic, San Diego, CA (US); Messay Amerga, San Diego, CA (US); Jeremy M. Stein, Haifa (IL); Ivan Fernandez-Corbaton, San Diego, CA (US); Ashok Bhatia, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 2 days.

(21) Appl. No.: 10/056,877

(22) Filed: Jan. 24, 2002

(65) Prior Publication Data

US 2003/0086512 A1 May 8, 2003

Related U.S. Application Data

(60) Provisional application No. 60/336,187, filed on Oct. 29, 2001.

(51) Int. Cl.[7] ............................. H04L 27/06; H04B 1/69
(52) U.S. Cl. ........................................ 375/343; 375/150
(58) Field of Search ................................. 375/343, 130, 375/143, 150, 152, 316; 370/320, 335, 342

(56) References Cited

U.S. PATENT DOCUMENTS

| 5,644,591 | A | | 7/1997 | Sutton ........................ 375/200 |
| 5,790,589 | A | | 8/1998 | Hutchison, IV et al. ..... 375/200 |
| 5,872,774 | A | | 2/1999 | Wheatley, III et al. ..... 370/335 |
| 6,324,210 | B1 | * | 11/2001 | Yang et al. .................. 375/152 |
| 6,507,571 | B1 | * | 1/2003 | Yamamoto ................... 370/335 |
| 6,519,277 | B2 | * | 2/2003 | Eidson ........................ 375/150 |

FOREIGN PATENT DOCUMENTS

| WO | 0070792 | 11/2000 | ........... H04B/7/216 |

* cited by examiner

*Primary Examiner*—Khai Tran
(74) *Attorney, Agent, or Firm*—Philip Wadsworth; Charles Brown

(57) ABSTRACT

A parameter estimator for estimating one or more parameter(s) from a correlation function derived from a signal using a dynamically variable search window is described. The parameter estimator may be employed in a subscriber station to estimate the time of arrival of one or more base station pilot signals in a wireless communication system. This information may be utilized in an overall advanced forward link trilateration (AFLT) process for estimating the location of the subscriber station.

58 Claims, 14 Drawing Sheets

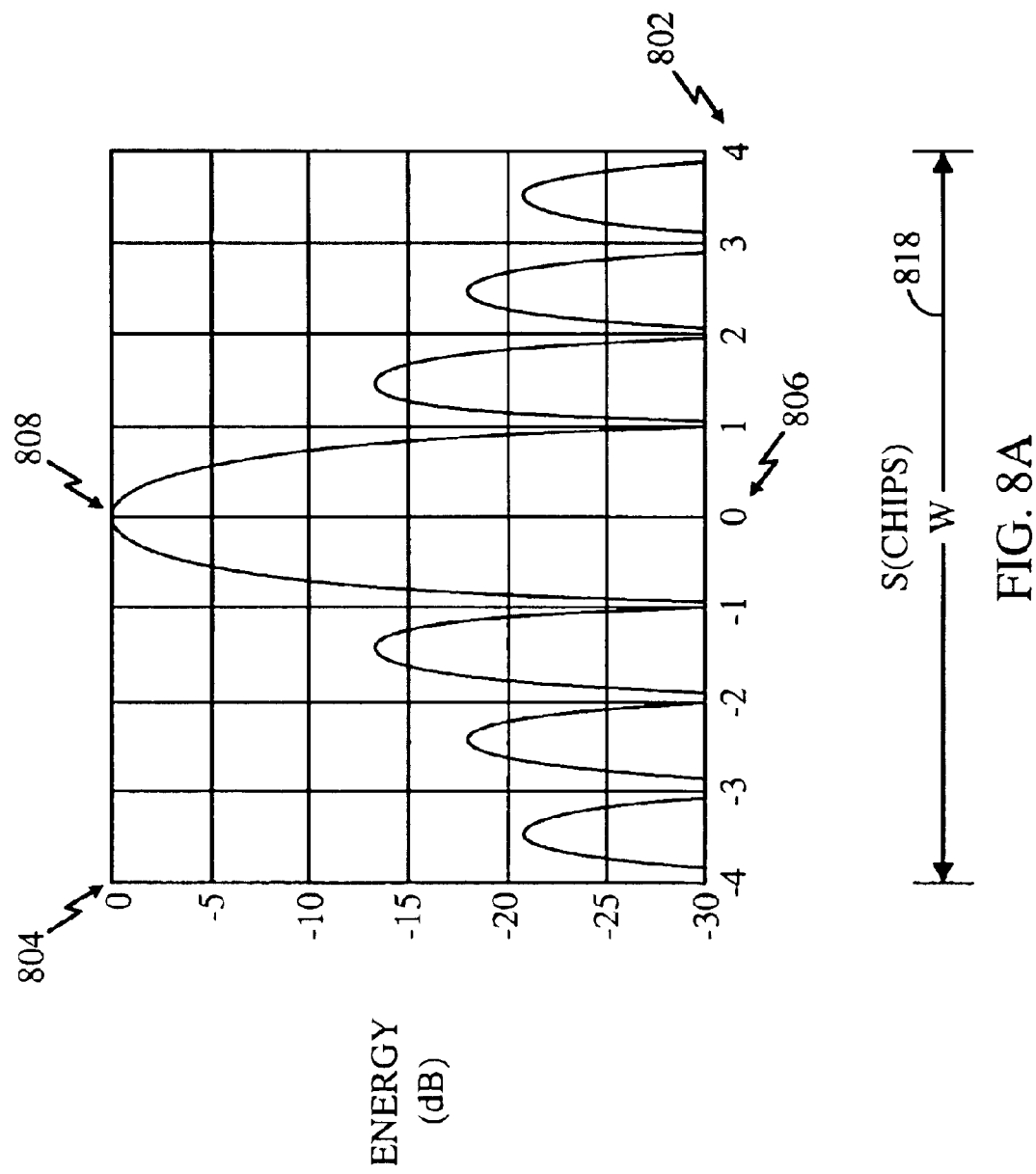

PARAMETER ESTIMATOR WITH DYNAMICALLY VARIABLE SEARCH WINDOW SIZE AND/OR PLACEMENT

RELATED APPLICATIONS

This application claims priority to U.S. Provisional Application No. 60/336,187, filed on Oct. 29, 2001.

FIELD OF THE INVENTION

This invention relates to the field of parameter estimation using correlation analysis, and more specifically, to a parameter estimator employing correlation analysis for estimating parameter(s) of signals subject to distortions caused by factors such as multi-path.

RELATED ART

The Global Positioning System (GPS) is a collection of satellites each of which travels in a precise orbit above the earth's surface. Each satellite transmits a signal modulated with a pseudo-noise (PN) code unique to the satellite. Each PN code comprises a predetermined number of chips. A GPS receiver receives a composite signal comprising a mixture of signals from each of the satellites that are visible to the receiver. A signal estimator in the receiver detects a transmission from a particular satellite by determining the degree of correlation between the received signal and shifted versions of the PN code for that satellite. If a peak of sufficient quality in the correlation value for one of the shift offsets is detected, the receiver is considered to have detected the transmission from the satellite.

The receiver estimates its location by detecting transmissions from at least four of the satellites. For each detected transmission, the receiver uses the shift in the PN code to estimate the delay (in terms of chips or fractions of chips) between time of transmission and time of arrival. Given the known velocity of the transmission, the receiver estimates the distance between itself and the satellite. This estimated distance defines a sphere around the satellite. The receiver knows the precise orbits and positions of each of the satellites, and continuously receives updates to these orbits and positions. From this information, the receiver is able to estimate its position (and the current time) from the point where the spheres for the four satellites intersect.

The FCC has mandated that subscriber stations, including but not limited to mobile stations, in wireless communications systems be capable of estimating their locations in order to promote rapid responses to 911 and other emergency calls. In response to this mandate, efforts are underway to equip subscriber stations with the means to estimate their locations from GPS satellite transmissions. Moreover, since base stations in wireless communications systems transmit pilot signals modulated with unique PN codes, these efforts also include allowing subscriber stations to estimate their locations from the transmissions of multiple base stations or sectors, or combinations of base stations or sectors and GPS satellites.

A signal detector in a GPS receiver attempts to detect the transmission from a satellite from a correlation function which is derived by multiplying the received signal (which is typically a composite signal comprising a mixture of the transmissions from multiple satellites) with shifted versions of the PN code for the satellite within a range defined by a predetermined search window, and then, for each shifted PN code, adding the multiplied values over a predetermined integration time to achieve a value representative of the degree of correlation between the received signal and the shifted PN code.

However, such a detector is not generally effective for the purpose of detecting transmissions from multiple base stations or sectors since, unlike the search windows used for searching for GPS satellites, the search windows used for searching for base stations or sectors are determined by the network and are not optimized for position location technologies. The search windows provided by the network are optimized for handoff performance. Consequently, the estimator will typically exceed available search time constraints if the size of the predetermined search window is set too large or the window is inappropriately placed.

Consider, for example, a detector which attempts to detect 40 different base station or sector signals using a predetermined search window of 400 different PN code offsets for each base station or sector signal. If the detector employs a relatively long integration time, e.g., 26.67 mS, so it can detect the weakest signals, even assuming it can evaluate 16 offsets simultaneously, the detector will require 26.67 seconds to perform the search, which is prohibitive given what are typical time constraints of 2–4 seconds.

RELATED APPLICATIONS

This application is related to U.S. patent application Ser. No. 10/057,689 filed on even date herewith, Ser. No. 10/060,885, filed Jan. 29, 2002, and Ser. No. 10/125,182, filed Apr. 17, 2002, all owned in common by the assignee hereof.

SUMMARY

The invention provides a parameter estimator for estimating one or more parameter(s) of a signal through correlation analysis using a dynamically variable search window. For purposes of this disclosure, a dynamically variable search window is one where the size and/or placement of the window can vary responsive to a priori information regarding the signal, or can vary from signal to signal, or can vary from estimation attempt to estimation attempt, or can vary from default values, or any combination of the foregoing. The signal may be a standalone signal or part of a composite signal comprising multiple signals. Examples of the parameter(s) which may be estimated include, but are not limited to, time of arrival (TOA), root mean squared error (RMSE) for the TOA estimate, energy per chip ($E_c$) divided by interference noise density ($I_o$), etc.

The estimator comprises correlation logic and analysis logic. The correlation logic determines a correlation function of a signal in relation to a selected identification code which, in one embodiment, is a PN code. The correlation function represents the correlation between the signal and shifted versions of the identification code. The range of the shifted versions of the identification code which are considered defines a search window. The size and/or placement of the search window can dynamically vary responsive to a priori information regarding the signal, or from signal to signal, or from estimation attempt to estimation attempt, or from default values, or combinations of the foregoing. The analysis logic analyzes the correlation function for the signal and, responsive thereto, determines one or more parameter(s) for the signal.

Various methods of operating the estimator are possible. In one embodiment, the estimator is provided with a priori information regarding a signal, and, responsive thereto, dynamically determines the size and/or placement of a search window. In one implementation, the estimator may employ a default search window and dynamically vary the size and/or placement of the search window from the default values responsive to a priori information regarding the signal which is provided to it. It then derives from the signal a correlation function representing the correlation between the signal and shifted versions of an identification code, where the range of the shifted identification codes which are represented is defined by the search window. It then attempts to estimate one or more parameter(s) relating to the signal from the correlation function.

The a priori information may be provided from a source external to the estimator, e.g., a wireless communications system in which a subscriber station including the estimator is employed. Alternatively, or in addition, the a priori information may be provided from the estimator itself, e.g., from a previous search performed in relation to the signal. Alternatively, or in addition, the a priori information may consist of a general knowledge of channel characteristics, e.g., weaker signals typically have later time of arrivals than the strongest signals.

When the technique represented by any of these methods is applied to a group of signals during a search cycle, performance is improved compared to the performance using the default search window parameters provided by the network, since the size and/or placement of the search window which is used may be tailored to an individual signal based on a priori information regarding the signal. Therefore, search cycle time is reduced.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

In the various figures of the drawing:
High Frequency Circuit in Multiple Domains According to the Invention.

FIG. 8A is a time domain representation of one example of a correlation function for a CDMA pilot signal;

DETAILED DESCRIPTION

Example Application

Figure 1:
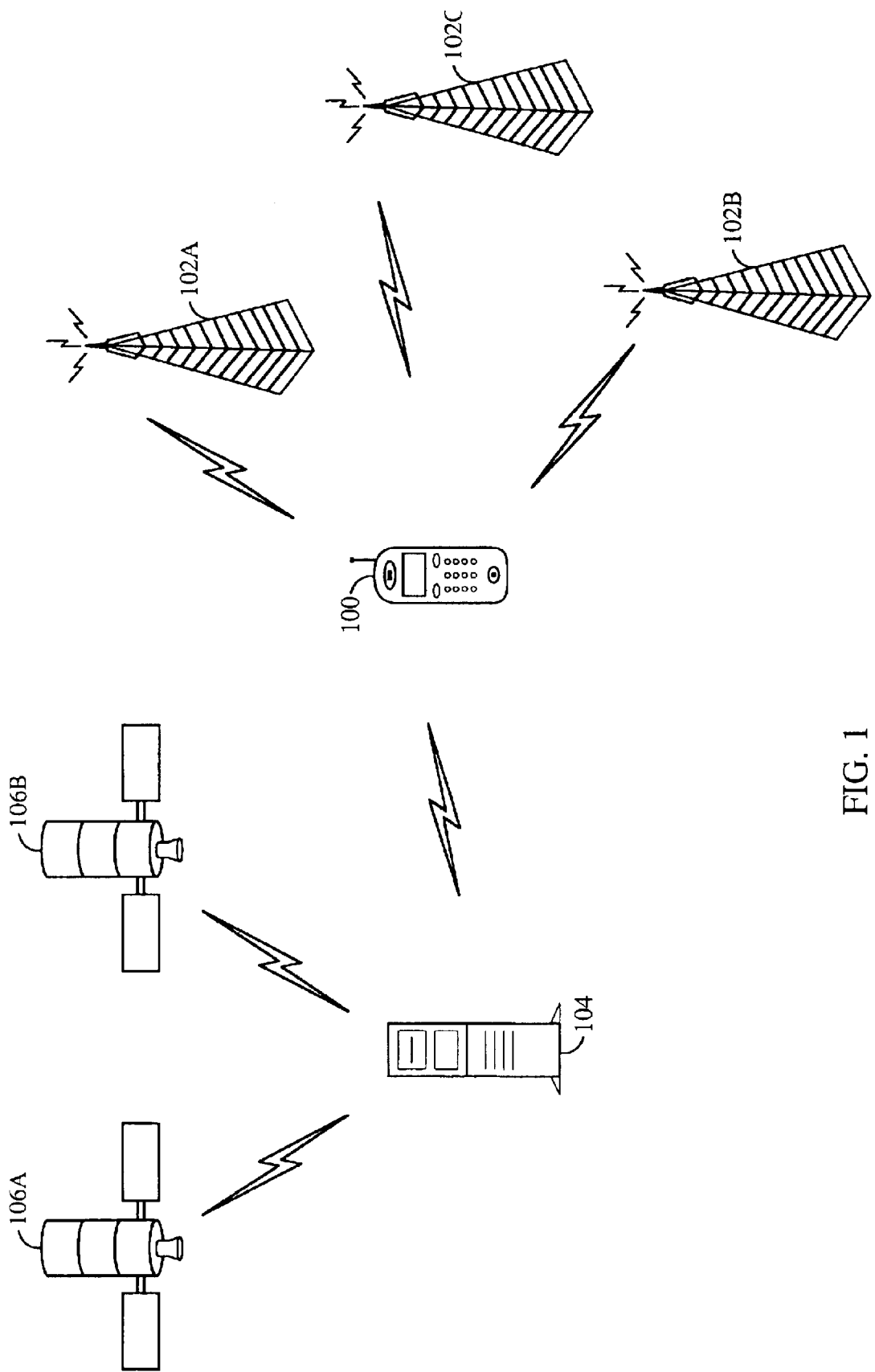
FIG. 1 is an example application of a parameter estimator according to the invention.

Referring to FIG. 1, an example application of a parameter estimator according to the invention is illustrated. In this example application, the parameter estimator is employed within subscriber station 100 for the purpose of estimating its location. The subscriber station 100 is a component of a wireless communication system such as but not limited to cellular, fixed wireless, PCS, and satellite communications systems. Moreover, the wireless communications system may provide for multiple access in accordance with CDMA, TDMA, FDMA, or GSM multiple access protocols, or combinations thereof.

One or more base stations or sectors 102a, 102b, and 102c are employed in the wireless communications system. Each base station or sector 102a, 102b, 102c or sector thereof transmits a pilot signal which is modulated with a repeating pseudo-random noise (PN) code which uniquely identifies that base station or sector. For IS-95 compliant CDMA systems, the PN code is a sequence of 32,768 chips which is repeated every 26.67 mSec.

One or more GPS satellites 106a, 106b may also be visible to the subscriber station 100 or position determination entity (PDE) 104. Each of the GPS satellites also transmits a signal which is modulated with a repeating PN code which uniquely identifies that satellite. In current GPS systems, the PN code is a sequence of 1,023 chips which is repeated every millisecond.

The parameter estimator within subscriber station 100 is configured to estimate various parameters of the pilot signals transmitted from the base stations or sectors 102a, 102b, and 102c and/or the signals transmitted from the GPS satellites 106a, 106b. Such parameters may include TOA, time of transmission, energy per chip divided by interference power density ($E_c/I_0$), root mean squared error (RMSE) associated with the TOA parameters, etc.

These parameters, once estimated, are provided to PDE 104 which estimates the location of subscriber station 100 responsive thereto. (The PDE 104 may be a sever in a computer network such as the Internet.) Once estimated, the position of the subscriber station 100 is downloaded to it so that it is available from the subscriber station 100 in the event of a 911 or other emergency call.

The PDE 104 may estimate the location of the subscriber station 100 from the measurements relating to the base stations or sectors 102a, 102b, and 102c, or, to increase accuracy, from the combined measurements of one or more of the base station(s) or sector(s) 102*a*, 102*b*, 102*c* and one or more of the GPS satellite(s) 106*a*, 106*b*.

The PDE 104 may provide other forms of assistance to the subscriber station 100. For example, PDE 104 may continuously track the GPS satellites, and provide assistance to the subscriber station 100 in locating the signals transmitted from the GPS satellites 106*a*, 106*b*. This avoids the need to have the subscriber station 100 undergo time-consuming "cold start" procedures for locating the satellites when it is powered up.

It should be appreciated that many other applications of the parameter estimator of the invention are possible, so this example should not be taken as limiting.

Embodiments of the Invention

Figure 2A:
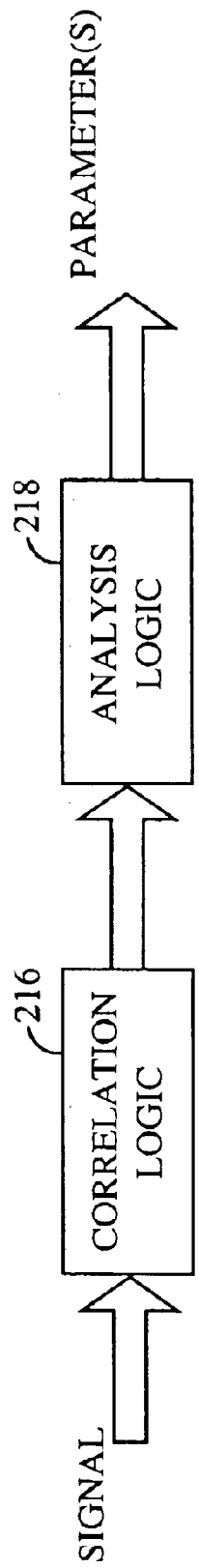
FIG. 2A is a simplified block diagram of one embodiment of a parameter estimator according to the invention.

Referring to FIG. 2A, a block diagram of one embodiment of a parameter estimator according to the invention is illustrated. A signal is input to correlation logic 216. The signal may be a standalone signal or part of a composite signal comprising multiple signals. In one application, the signal is a pilot signal from a base station or sector in a wireless communications system and is part of a composite signal representing the transmissions from multiple base stations or sectors. The signal is modulated with a identification code which, in one example, is a PN code. The identification code may be modulated onto the signal on a one-time or repeating basis.

Correlation logic 216 is configured to determine, using a dynamically variable search window, the correlation between the signal and shifted versions of an identification code. Obviously, the greatest degree of correlation will be exhibited if the identification code used by the correlation logic 216 matches that modulated onto the signal. The correlation logic 216 outputs a correlation function which represents the correlation between the signal and shifted versions of the identification code which are within a range defined by the dynamically determined search window. This correlation function is input to analysis logic 218. Analysis logic 218 analyzes this correlation function and, responsive thereto, estimates one or more parameter(s) relating to the signal.

For purposes of this disclosure, the term "logic" means hardware, software, or a combination of hardware and software, and the phrase "dynamically variable search window" refers to the quality or capability of varying the size and/or position of a search window responsive to a priori information regarding a signal, or from signal to signal, or from estimation attempt to estimation attempt, or from default values, or any combination of the foregoing.

Figure 2B:
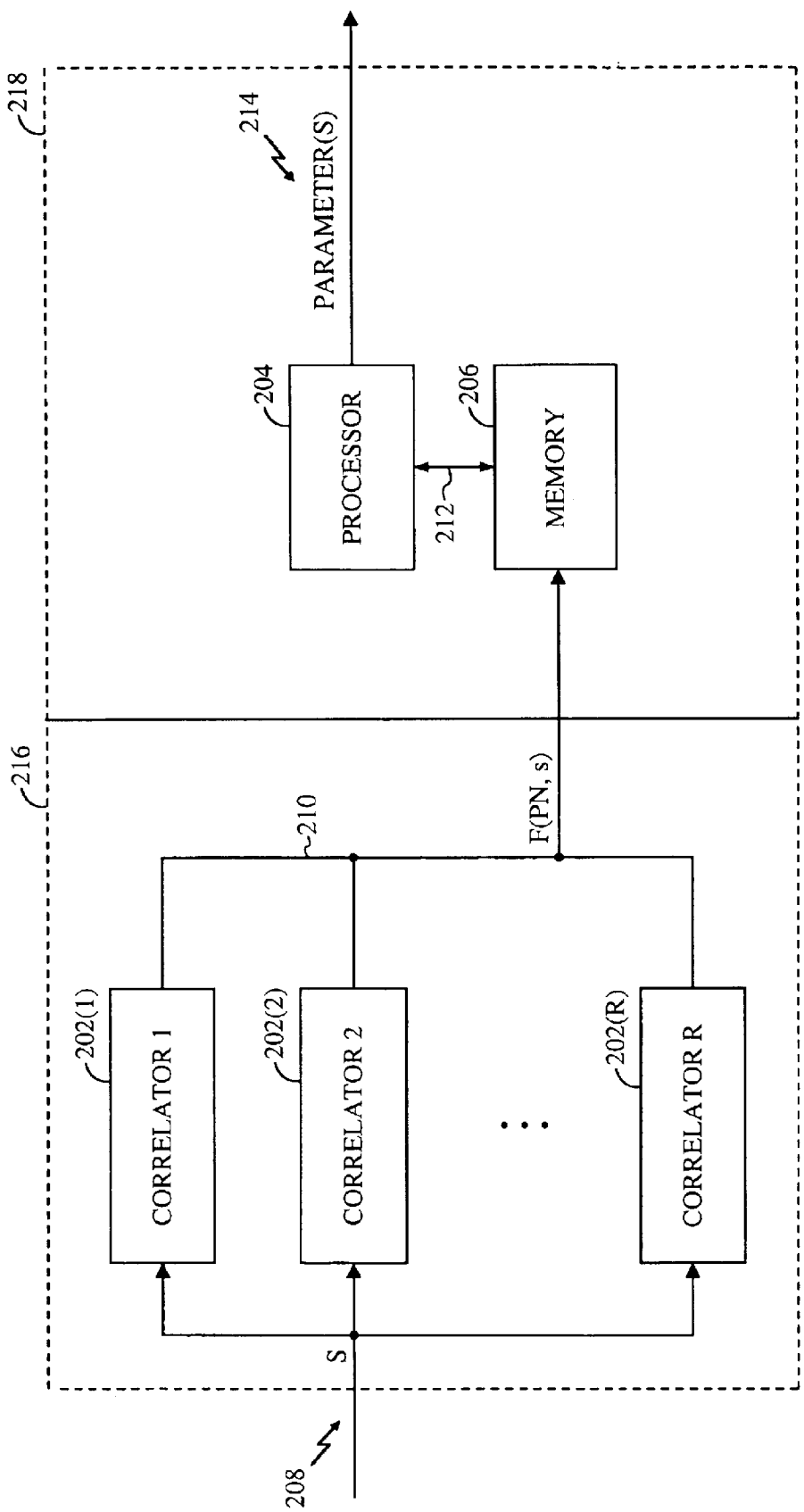
FIG. 2B is a simplified block diagram of one implementation of a parameter estimator according to the invention.

Referring to FIG. 2B, a block diagram of a second embodiment of a parameter estimator according to the invention is illustrated. A signal S is input in parallel to each of R correlators 202(1), 202(2), . . . , 202(R), where R is an integer of one or more, over one or more signal line(s) 208. Again, the signal S may be a standalone signal or a part of a composite signal. In one implementation example, R is 16. In a second implementation example, R is 256. Each of the R correlators determines, in parallel, a correlation value representing the degree of correlation between a shifted version of a selected PN code and the signal. In one implementation, each of the R correlators operates using a shifted version of the same PN code, with each correlator assigned a different shift value.

In one example, each sample of the signal S is a complex number having in-phase (I) and quadrature (Q) components. In one implementation, a correlation value C, which depends on the PN code and the shift s in the PN code which are used, is coherent, i.e., retains phase information, and is a complex number which can be expressed as follows:

$$C(PN, s) = \sum_{i=k+0}^{k+N-1} PN(i-s) \cdot S(i) \qquad (1)$$

where N is the dynamically variable (coherent) integration time in terms of chips, S(i) are samples of the received signal, and k is an arbitrary origin.

In a second implementation, the correlation value C is a real number which is derived by non-coherently combining, i.e., not retaining phase information, M successive coherent integrations, each conducted over N chips. In this implementation, the correlation value C may be expressed as follows:

$$C(PN, s) = \sum_{i=1}^{M} \sum_{i=k+(j-1)N}^{k+jN-1} |PN(i-s) \cdot S(i)| \qquad (2)$$

The range of the shift s that is desired to be tested is the search window W. If the number R of correlators is less than the desired window size, W, additional iterations may be performed by the R correlators until W correlation values have been obtained. The W values C(PN, s) output by the correlators together form a correlation function F(PN, s), which represents the degree of correlation between the signal and the shift s of the PN code (where the shift s is expressed in terms of chips) over a desired search window W. In the case where the PN code is repeatedly modulated onto the signal, the correlation function F(PN, s) will be periodic.

FIG. 8A illustrates an example of one period of a periodic correlation function F(PN, s) for a pilot signal in a CDMA wireless communication system. The window size W (in terms of chips) in this example, which is identified with numeral 818, is 8, and the window placement is centered at the origin 806. The horizontal axis 802 represents the shift of the PN code (expressed in terms of chips), and the vertical axis 804 represents the correlation function F(PN, s) (expressed in terms of Energy(dB)). As illustrated, the correlation function in this example reaches a peak at the origin 806.

Referring back to FIG. 2B, once determined, the function F(PN, s) is output on one or more signal line(s) 210 and stored in memory 206. In like manner, the function F(PN, s) for other PN codes can be determined by the correlators 202(1), 202(2), . . . , 202(R), and stored in memory 206.

A processor 204 is configured to retrieve a function F(PN, s) from memory 206 over one or more signal line(s) 212, and attempt to estimate therefrom one or more parameter(s) relating to the signal from which it was derived. In one implementation, the processor 204 attempts to estimate time of arrival (TOA), root mean squared error (RMSE) of the TOA estimate, and energy per chip divided by total interference power density ($E_c/I_0$) for the signal. If the attempt is unsuccessful, the processor 204 may direct the R correlators 202(1), 202(2), . . . , 202(R) to re-determine the correlation function F(PN, s) using a different search window size and/or placement. This process may iterate one or more times until the one or more parameter(s) may be estimated from the correlation function or it is determined that the parameter(s) cannot be estimated. If the one or more parameter(s) can be and are estimated, the processor 204 may be configured to output them over one or more signal line(s) 214.

Figure 8B:
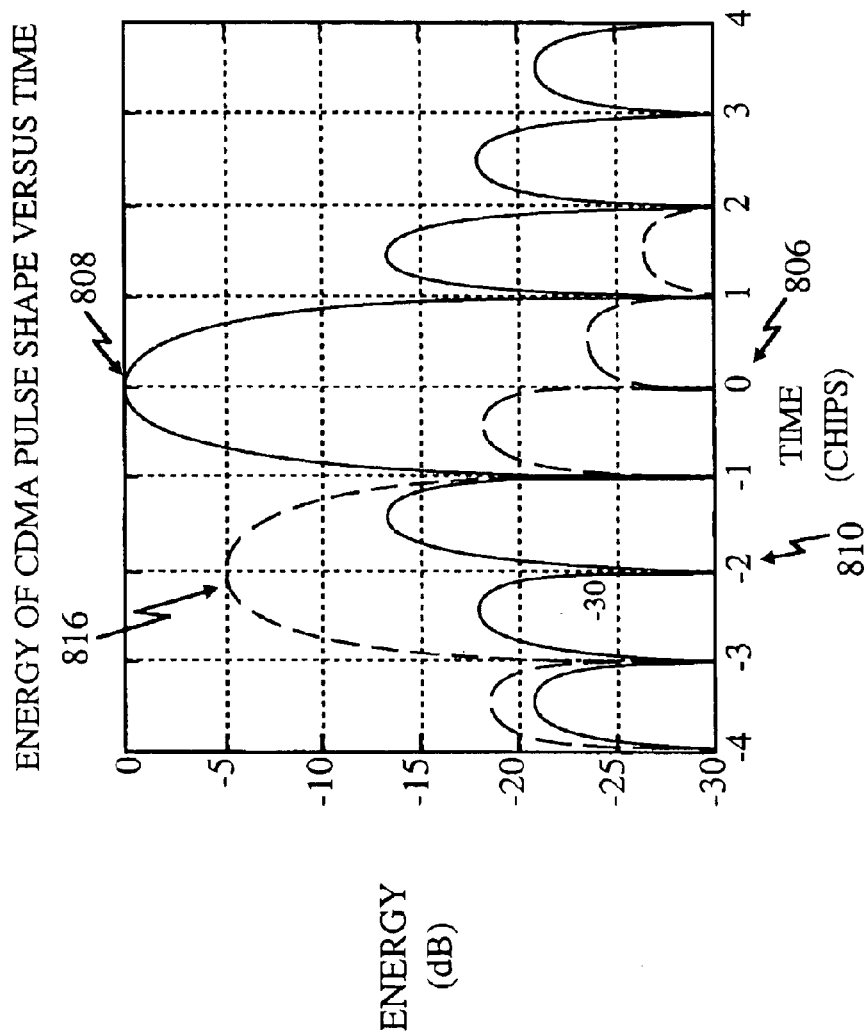
FIG. 8B illustrates direct line-of-sight and reflected renderings of the function of FIG. 8A.

In one implementation, the processor 204 is configured to estimate the time of arrival of a base station or sector pilot signal from a peak of the function F(PN, s) derived from that pilot signal. Referring to FIG. 8A, the time of arrival can generally be represented by the offset s corresponding to the main peak 808 of the correlation function F(PN, s), which happens to be the origin 806 in the example of FIG. 8A, unless, due to multi-path, there is an earlier-in-time (and weaker) independent arrival which is distinguishable from the sidelobes of the main peak. In this latter case, referring to FIG. 8B, a weaker independent arrival is depicted in the figure with a dashed line. In this situation, the offset 810 corresponding to the peak 816 of this earlier-in-time arrival represents the time of arrival of the corresponding pilot in contrast to the offset 806 corresponding to the peak 808 of the stronger but later-in-time arrival. Consequently, to accurately depict the time of arrival parameter, the processor 204 should detect the earliest peak of the correlation function F(PN, s) that is not a sidelobe.

The presence of the peaks 808, 816 depends on the search window used to derive the correlation function. If the size of the search window is set too low, or the search window is inappropriately placed, one or both of the peaks 808, 812 may go undetected. If, on the other hand, the size of the search window is set too high, the time required to search through a group of signals may exceed available timing constraints. In the first case, the time of arrival cannot be accurately estimated. In the second case, the time of arrival cannot be estimated within available timing constraints. If the search window is set so that the peaks 808, 812 can be detected, the time of arrival can generally be accurately estimated.

Figure 8C:
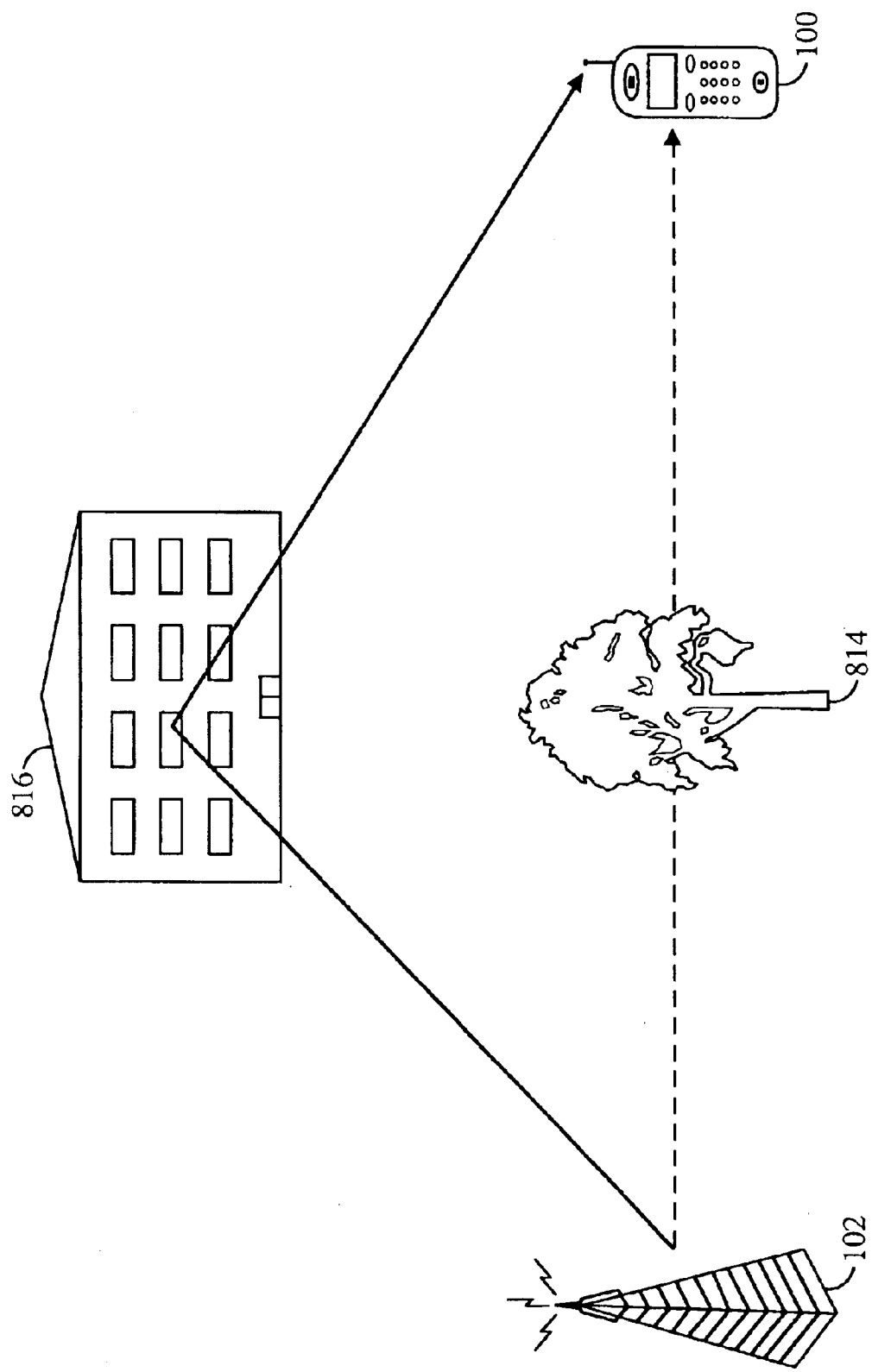
FIG. 8C illustrates direct and indirect arrivals of a pilot signal at a subscriber station due to multi-path.

FIG. 8C depicts an example of a situation where an independent but weaker earlier-in-time arrival might be present. As illustrated, the direct line-of-sight path between base station or sector 102 and subscriber station 100 is blocked by an obstruction 814 (a tree in the example) which attenuates but still allows passage of the pilot signal. At the same time, due to multi-path, the same pilot signal may reflect off of another obstruction 816 (a building in the example) and be received by the subscriber station 100 with less attenuation than the direct line-of-sight arrival. The time of arrival of the pilot should be determined from the weaker direct line-of-sight arrival of the pilot signal (through obstruction 814), and not from the stronger arrival which reflects from obstruction 816.

Referring back to FIG. 2B, the processor 204 may be any device capable of executing a series of instructions embodying a process, including but not limited to a computer, microprocessor, an ASIC, finite state machine, DSP, or some other mechanism.

In addition, the memory 206 may be any device readable by a processor and capable of storing a series of instructions embodying a process, including but not limited to RAM, ROM, EPROM, EEPROM, PROM, disk (hard or floppy), CD-ROM, DVD, flash memory, etc.

Figure 3A:
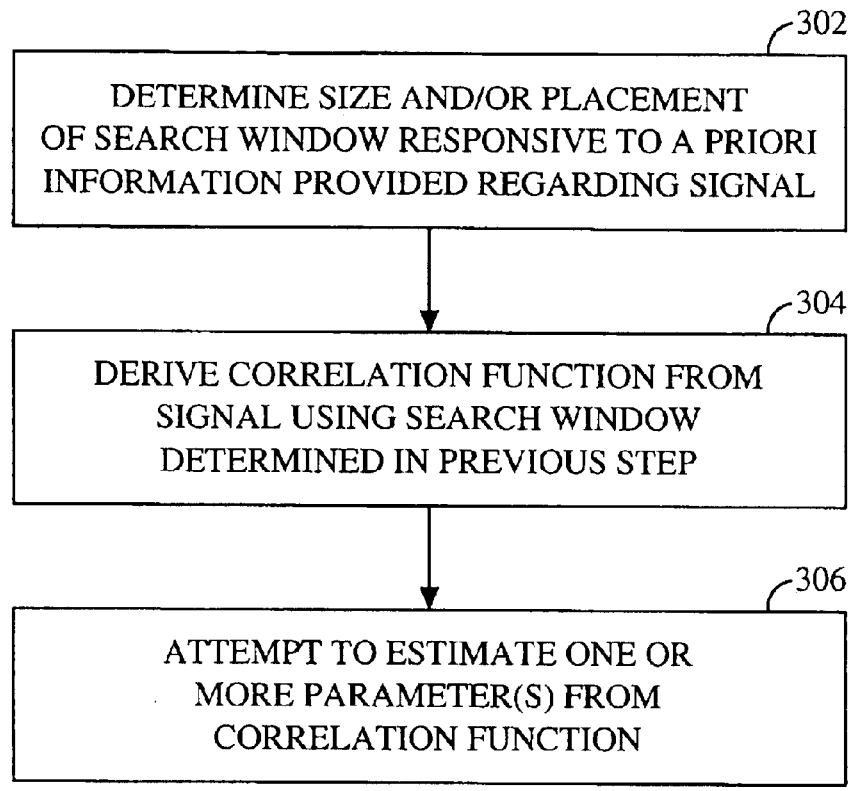
FIG. 3A is a flowchart of an embodiment of a method according to the invention of estimating one or more parameter(s) of a signal using a dynamically variable search window determined responsive to a priori information regarding the signal.

Referring to FIG. 3A, a flowchart of one embodiment of a method of estimating one or more parameter(s) of a signal using a dynamically variable search window is illustrated. The method begins with step 302, which comprises determining the size and/or placement of a search window responsive to a priori information regarding a signal. The method proceeds to step 304, which comprises deriving a correlating function from the signal using the search window determined in the previous step. Step 304 is followed by step 306, where an attempt is made to estimate one or more parameter(s) relating to the signal from the correlation function. Following step 306, the method may iterate one or more times until the one or more parameter(s) are estimated or it is determined that the one or more parameter(s) cannot be estimated.

Several implementations of this method are possible. In one implementation, the signal is a pilot signal in a wireless communication system, and the estimator determines the size and/or placement of a search window responsive to a priori information regarding the signal provided to the estimator (or a subscriber station including the estimator) from the system. For example, the system may indicate to the subscriber station that the signal is on the neighbors list for the subscriber station, i.e., within the list of pilots which are neighbors to the active pilot with which the subscriber station is currently communicating. The system may also indicate to the subscriber station the size and placement of the search window that it assigns to pilots on the neighbors list for acquisition purposes. (Typically, IS-95 compliant systems assign to the pilots in a neighbors list a search window having a size of 100–452 chips centered on the first arriving usable multi-path component). In response, the estimator within the subscriber station may assign to the pilot the same window size and placement for parameter estimation purposes.

Then, due to movement of the subscriber station or some other dynamic change in network conditions, the system may indicate to the subscriber station that the pilot is on the active list, i.e., the list of pilots with which the subscriber station is currently communicating (there may be more than one in a soft or hard handoff situation), or the candidate list, i.e., the list of pilots that are candidates for becoming active pilots. If so, since the system will have a rough idea of the time of arrival of pilots on the active and candidate lists based on network layout, the estimator may dynamically reduce the size of the search window, e.g., to 20–100 chips, and center it on or otherwise place it in relation to the anticipated time of arrival, thereby speeding up the parameter estimation process.

In a second implementation, the estimator may conduct an initial search of a pilot with default window size and placement values provided by the system. However, once this initial search has been completed, the subscriber station has a rough idea of the time of arrival of the pilot. Responsive to this information, the estimator may reduce the size of the search window and center it on or otherwise place it in relation to the anticipated time of arrival, again, speeding up the parameter estimation process.

In a third implementation, a network entity, e.g., base station or sector, PDE or some other entity, may provide information to a subscriber station which conveys a rough estimate of the time of arrival of a pilot signal. For example, the entity may indicate the geographical location of the source of the pilot relative to a reference pilot such as an active pilot. In response, the subscriber station may estimate an anticipated time of arrival of the pilot relative to the reference pilot, reduce the size of the search window from a default value, and center the window on or otherwise place it in relation to the anticipated time of arrival.

In a fourth implementation, a subscriber station is configured to initially search pilots (for parameter estimation purposes) using the search windows and offsets assigned by the network to the pilots for acquisition purposes. However, a network entity, e.g., base station or sector, PDE, etc., may indicate to the subscriber station that the search windows are too large. In response, the subscriber station is configured to reduce the size of the search windows it applies for parameter estimation purposes and/or modify placement of the search windows.

In a fifth implementation, it is assumed that the strongest pilots are those which originate closest to the subscriber station, and that the other pilots originate from more distant locations than the strongest pilots. Consequently, in this implementation, if a pilot is not on the active or candidate lists, or is not detected above a certain signal strength, the subscriber station will reduce the search window size from a default value and center or otherwise place it to the right of a reference pilot such as an active pilot.

It should be appreciated that, in each of these implementations, the search window need not be dynamically centered on the anticipated time of arrival of the pilot, but can be offset with respect to this value. For example, in order to obtain an accurate estimate of time of arrival, it is desirable to detect for a given PN code the earliest peak that is not a sidelobe. To search for such an earlier peak, it may be desirable to bias the search window towards the left of the position of the strongest peak rather than at the strongest peak, and to reduce the size of the search window so that the search does not extend much to the right of the strongest peak.

Figure 3B:
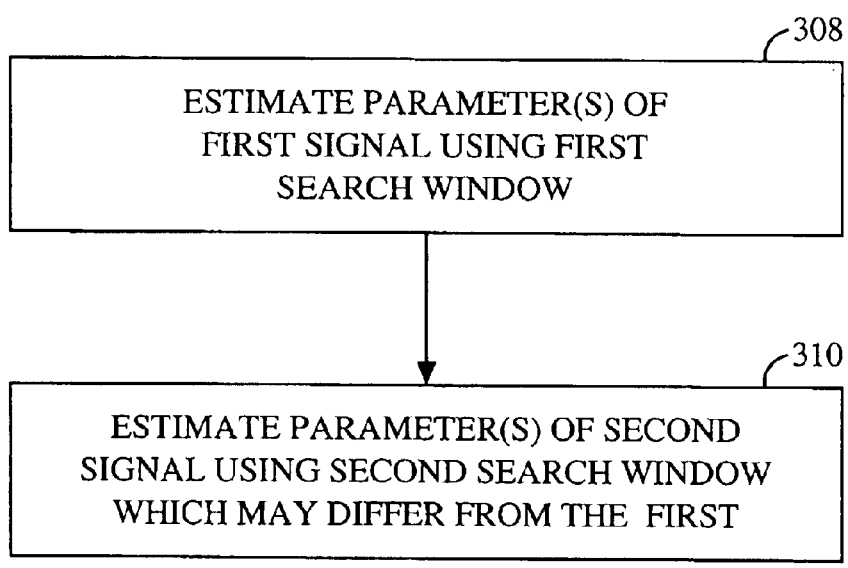
FIG. 3B is a flowchart of a second embodiment of a method according to the invention of estimating one or more parameter(s) of a signal using a dynamically variable search window which may vary from signal to signal.

Referring to FIG. 3B, a flowchart of a second embodiment of a method of estimating one or more parameter(s) of a signal using a dynamically variable search window is illustrated. The method begins with step 308, which comprises estimating one or more parameter(s) of a first signal from a correlation function derived using a first search window. The method proceeds to step 310, which comprises estimating one or more parameter(s) of a second signal from a correlation functions derived using a second search window which may differ or vary from the first. The second search window may have a smaller size than that of the first., and may also be differently positioned than the first, if, for example, a priori information is available for the second signal, but not the first, where the a priori information allows the estimator to roughly estimate a time of arrival of the second signal.

Figure 3C:
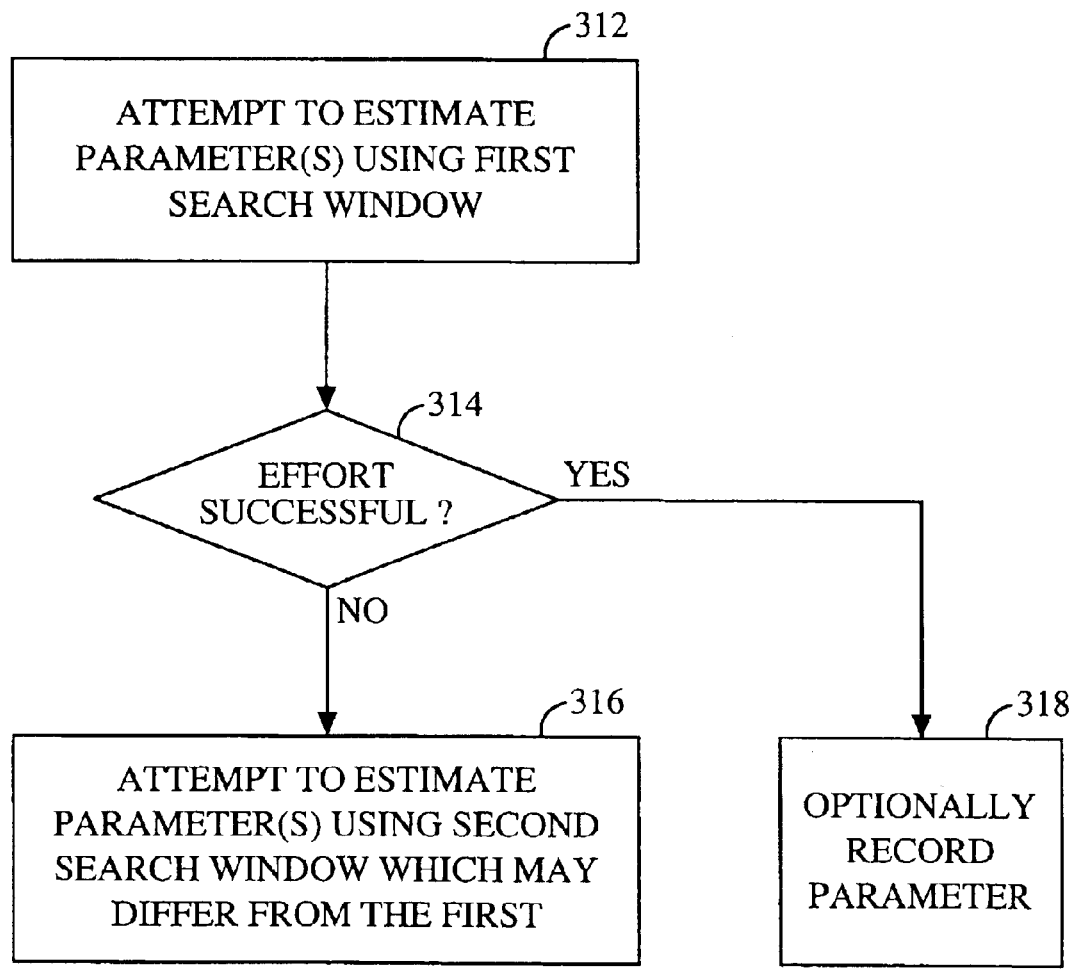
FIG. 3C is a flowchart of a third embodiment of a method according to the invention of estimating one or more parameter(s) of a signal using a dynamically variable search window which may vary from estimation attempt to estimation attempt.

Referring to FIG. 3C, a third embodiment of a method of estimating one or more parameter(s) of a signal using a dynamically variable search window is illustrated. This embodiment begins with step 312, which comprises attempting to estimate one or more parameter(s) of a signal from a correlation function derived using a first search window.

Step 312 is followed by step 314. In step 314, it is determined whether the estimation attempt 312 was successful or not. If so, the one or more parameter(s) may be recorded in a memory as indicated by optional step 318. If not, step 316 is performed. In step 316, a second attempt is made to estimate the one or more parameter(s) from a correlation function derived using a second search window which may differ from the first.

For example, if the first attempt was unsuccessful because a peak of the correlation function derived from the signal using the first search window could be detected but at an insufficient level of confidence, another attempt could be made to estimate the parameter(s) using a second search window which has a smaller size than the first, but which is centered at the peak detected during the first attempt.

From step 316, the method may continue iterating until the one or more parameter(s) are estimated, or it is determined that these parameter(s) cannot be estimated from the signal.

When the technique represented by any of these embodiments or implementations is applied to a group of signals, compared to using the default network parameters, performance is greatly improved. In particular, search time is reduced since the signals for which the estimator has a rough idea of time of arrival are not subject to the larger search windows appropriate for signals for which this information is unavailable.

Several examples and implementations of a method of estimating one or more parameter(s) of a signal using a dynamically variable search window in the context of an overall advanced forward link trilateration (AFLT) process for a CDMA wireless communications system will now be described.

Figure 4:
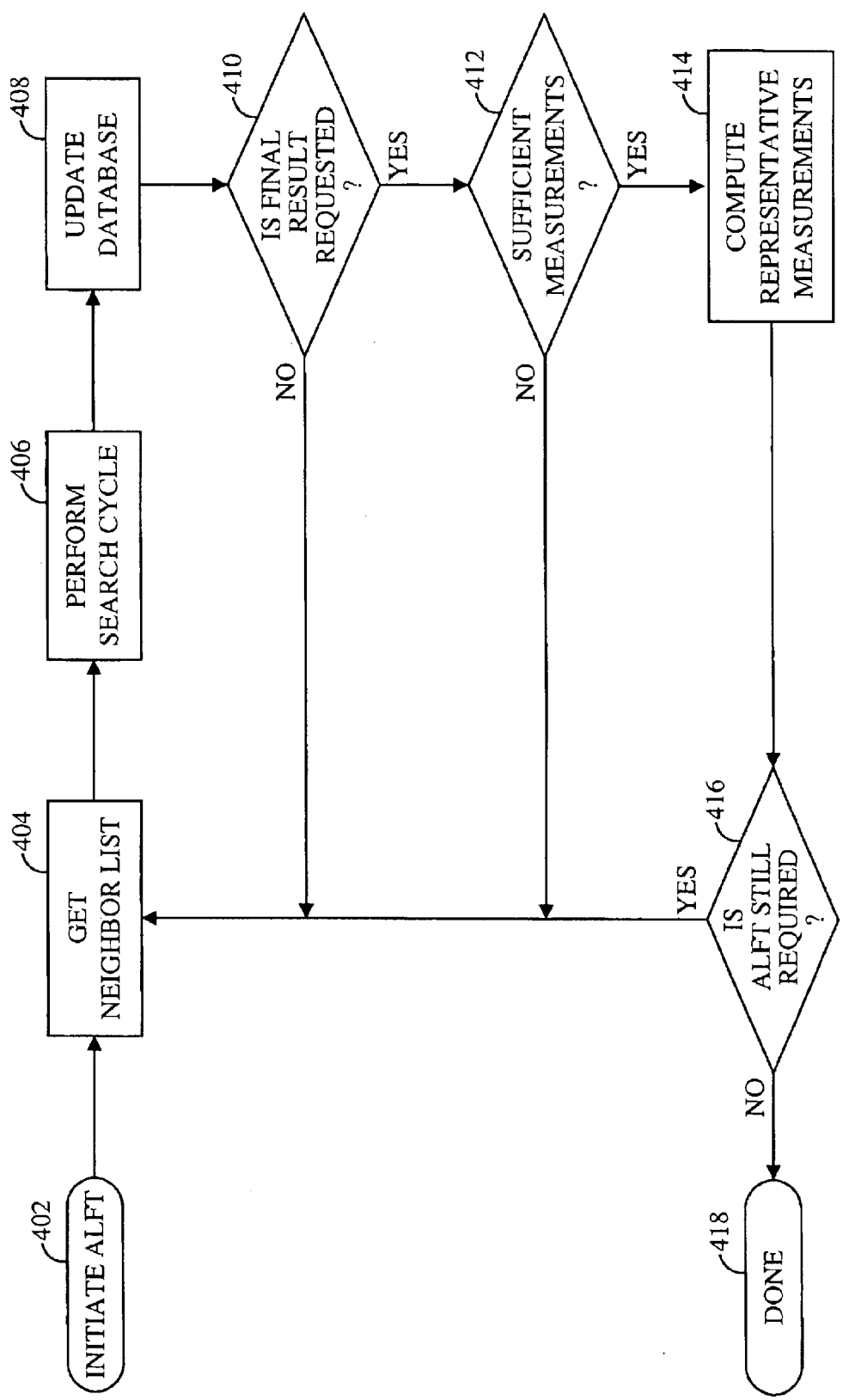
FIG. 4 is a high level flowchart of one implementation of an overall Advanced Forward Link Trilateration (AFLT) process.

Referring to FIG. 4, a flowchart of the overall AFLT process is illustrated. In step 402, the AFLT process is initiated. Control then passes to step 404, where the subscriber station obtains from the active base station or sector, i.e., the base station or sector with which it is currently registered, a list of the neighboring base stations or sectors. Step 406 is then performed. In step 406, the subscriber station conducts a search cycle, i.e., it performs a search of the pilots for the listed base stations or sectors (as well as the pilot of the active base station(s) or sector(s)). The output of the search cycle is a list of the pilots searched, and for each such pilot, either an indication that the pilot is undetectable, or one or more parameter(s) relating to the pilot, including but not limited to time of arrival (TOA), a measure of the level of confidence in the TOA parameter, such as a root mean squared error (RMSE), energy per chip divided by total interference power density ($E_c/I_0$), or any combination of the foregoing. Step 408 follows step 406. In step 408, the results of the search cycle are stored in a database.

Step 410 is then performed. In step 410, a determination is made whether a PDE in communication with the subscriber station has requested final results. If not, the method continues to iterate by looping back to step 404. To conserve memory space, the results of the search cycles obtained through these additional iterations may overwrite the earlier recorded results.

If final results have been requested, the method proceeds to step 412, where a determination is made whether sufficient measurements have been obtained to enable the position of the subscriber station to be estimated. In one implementation, this is deemed to occur when TOA measurements having a high level of confidence have been obtained from at least four base stations or sectors. In an alternate implementation, this is deemed to occur when a fixed number of search cycles have been completed. If insufficient measurements have been obtained, the method continues to iterate by looping back to step 404. If sufficient measurements have been obtained, the method proceeds to step 414. In step 414, a single measurement representative of the set of measurements in the database is obtained for each PN and is provided to the PDE. In one implementation, this step is performed by choosing the earlier measurement in the set of measurements, and averaging all of the measurements within a fixed amount of time of the earliest measurement.

Control then passes to step 416, in which the PDE indicates to the subscriber station whether or not AFLT is still required. If not, control passes to step 418, and the process terminates. If so, control passes to step 404 for another iteration of the method.

Figure 5A:
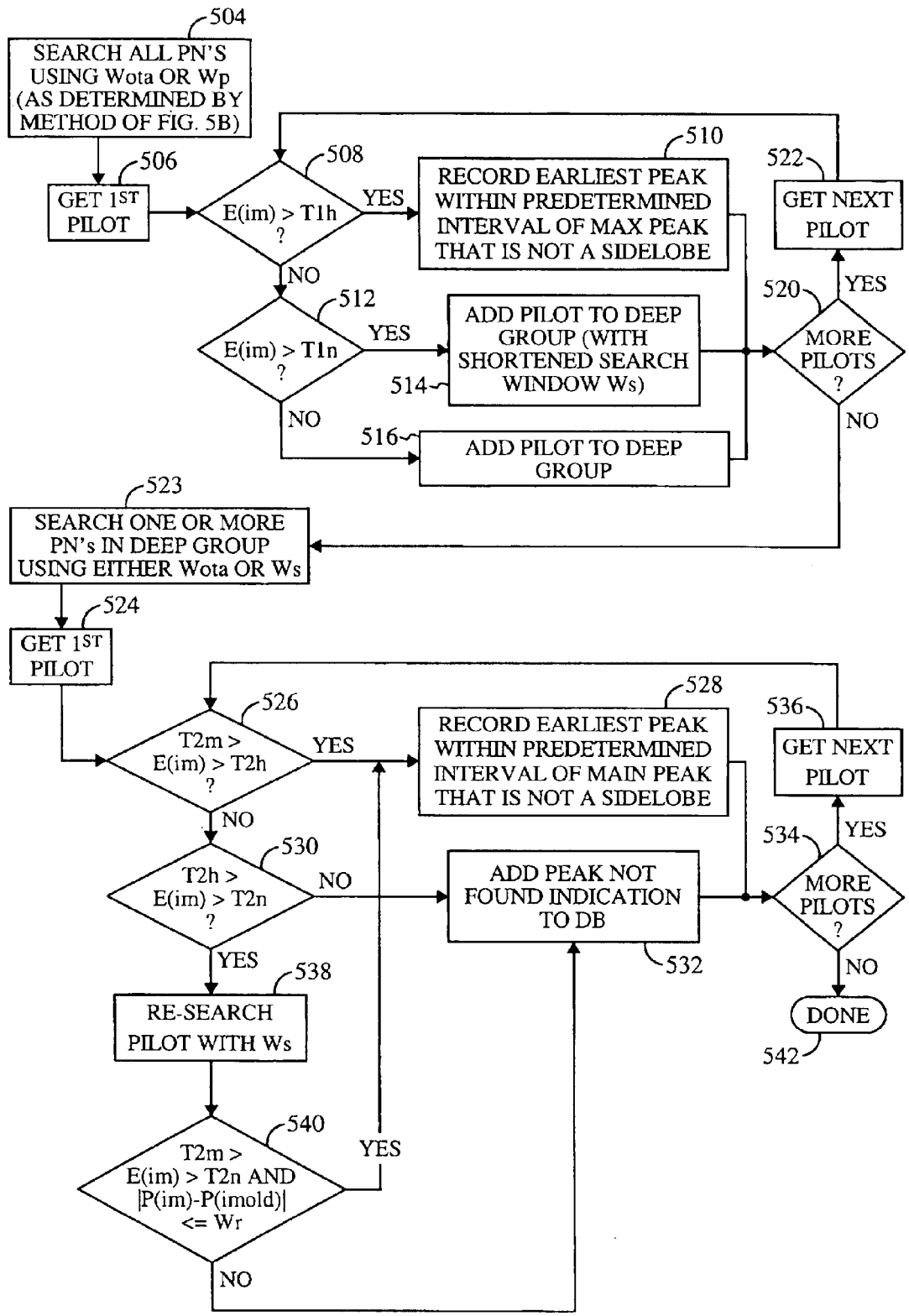
FIG. 5A is a flowchart of one example of a method according to the invention of estimating a time of arrival (TOA) parameter of a CDMA pilot signal using a dynamically variable search window.

Referring to FIG. 5A, a flowchart of one example of a method for performing the search cycle step 406 in FIG. 4 is illustrated. As illustrated, the method begins with step 504, where each of the listed (and active) pilots is "searched" using a dynamically variable search window determined in accordance with the method of FIG. 5B. In particular, a correlation function F(PN, s) is derived for each of the listed PN and active codes using a dynamically determined search window.

Figure 5B:
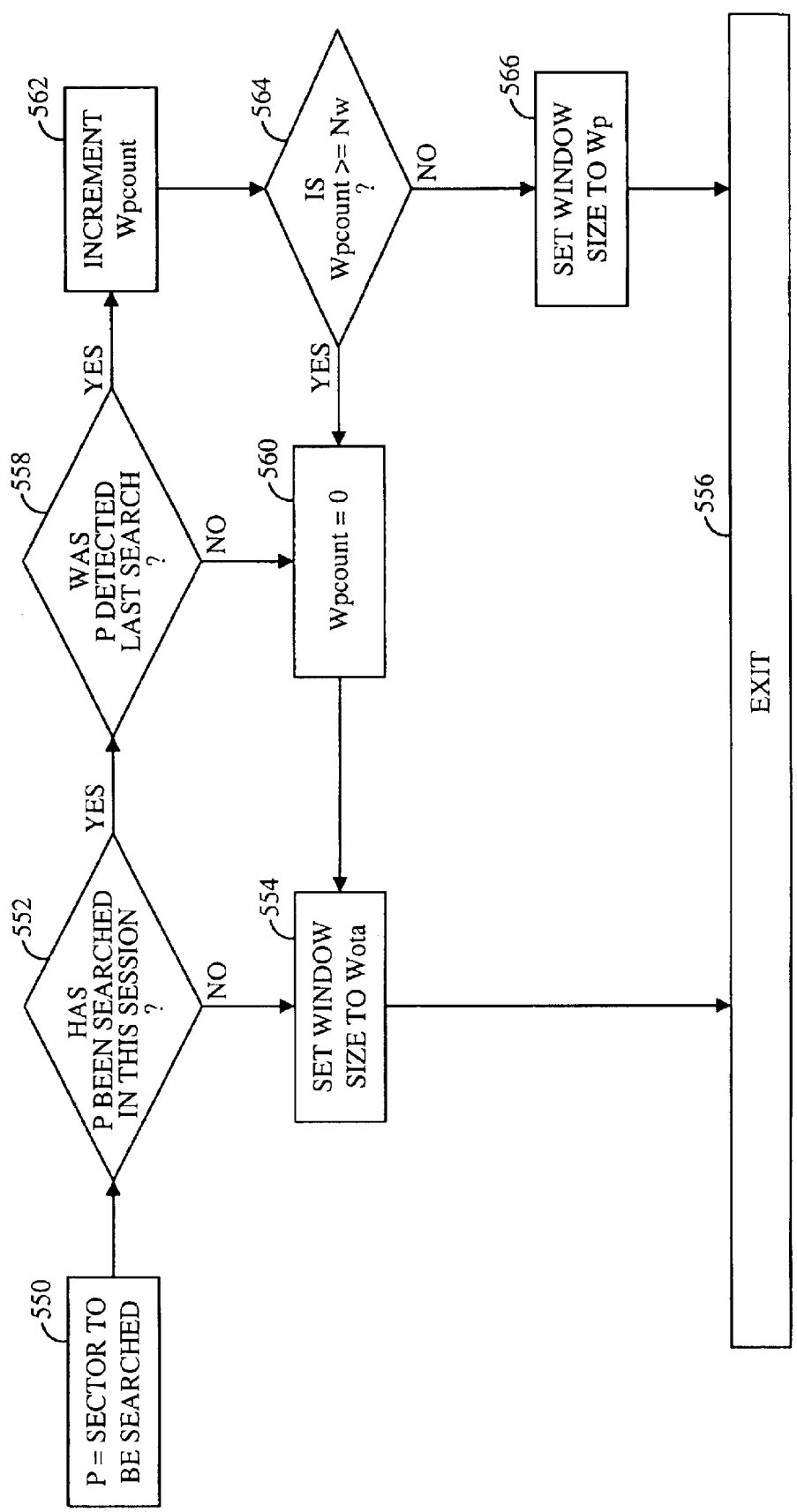
FIG. 5B is a flowchart of a method of determining a search window for an initial search of a pilot signal in the example of FIG. 5A.

Referring to FIG. 5B, the method begins with step 550, in which P, the pilot of the base station or sector to be searched, is identified. Step 550 is followed by step 552, where it is determined whether P has been previously searched during the current session, i.e., since the subscriber station began the current AFLT searching depicted by block 402 of FIG. 4. If not, step 554 performed. In step 554, the window size and placement for the pilot are set to default values, collectively referred to as Wota, which are assigned by the system and downloaded to the subscribe station over the air. For IS-95 compliant systems, the following default window sizes are possible (centered on the first arriving usable multi-path component):

| Window Number | Window Size (PN chips) | Window Number | Window Size (PN chips) |
|---|---|---|---|
| 0 | 4 | 8 | 60 |
| 1 | 6 | 9 | 80 |
| 2 | 8 | 10 | 100 |
| 3 | 10 | 11 | 130 |
| 4 | 14 | 12 | 160 |
| 5 | 20 | 13 | 226 |
| 6 | 28 | 14 | 320 |
| 7 | 40 | 15 | 452 |

For cdma 2000 ™ compliant systems, the following default placement values are possible:

| Search Offset Number | Placement (PN chips) |
|---|---|
| 0 | 0 |
| 1 | window_size/2 |
| 2 | window_size |
| 3 | 3 × window size/2 |
| 4 | -window_size/2 |
| 5 | -window_size |
| 6 | -3 * window_size/2 |
| 7 | Reserved |

From step 554, control passes to step 556, where an exit back to the main routine (FIG. 5A) is implemented.

In step 552, if it is determined that the pilot P has been searched in the current session, step 558 is performed. In step 558, it is determined whether the pilot P was detected during the last AFLT search cycle. If not, step 560 is performed. In step 560, a counter, Wcount, is reset to 0, and control passes to step 554. If, in step 558, it is determined that the pilot P was detected during the last cycle, step 562 is performed. In step 562, the counter Wcount is incremented by 1. Control then passes to step 564, where a determination is made whether the counter Wcount equels or exceeds Nw, a value which in one example is 4, although other examples are possible. If Wcount equals or exceeds Nw, control passes to step 560. Otherwise, control passes to step 566, where the window size is set to Wp. Moreover, since the pilot was detected on the previous search cycle, the window size is positioned so that it is centered on the location of the previously detected peak. In one example, Wp is 32 chips, although other examples are possible. Control then passes to step 556, where the method exits back to the main routine (FIG. 5A).

From the foregoing, it can be seen that an initial search of a pilot in a search cycle is conducted using a fault size and placement conveyed to the subscriber station over the air unless the pilot was detected in the previous search cycle. In that case, the pilot is searched using a search window of size Wp which is centered on the previously detected peak for the pilot, unless Nw successive searches of the pilot have been conducted with the search window size Wp. Then, to avoid catastrophic side effects which might occur through Nw successive searches using a reduced window size, the values are returned to the default values.

Turning back to FIG. 5A, after step 504, step 506 is then performed. This step comprises obtaining the correlation function F(PN, s) for the first pilot. Control then passes to step 508, which comprises testing the energy of the strongest peak of the correlation function for the pilot, E(im), in relation to a threshold T1h. (FIG. 6, to be discussed farther on, illustrates an example setting of this threshold).

If the energy of the strongest peak, E(im), exceeds the threshold T1h, step 510 is performed. In step 510, the position of the earliest peak within a predetermined interval of the strongest peak that is not a sidelobe is recorded. (This step returns the position of the strongest peak if an earlier peak within a predetermined interval of the strongest peak and that is distinguishable from the sidelobes of the strongest peak is not detected.). The corresponding time of arrival, RMSE, and $E_c/I_0$ measurements for the pilot are also derived and recorded.

If the energy of the strongest peak, E(im) does not exceed the threshold T1h, control then passes to step 512. In step 512, the energy of the strongest peak E(im) is tested in relation to a threshold T1n. (See FIG. 6 for an example setting of this threshold.).

If the energy of the strongest peak, E(im), exceeds the threshold T1n, control passes to step 514, where the pilot is added to a "deep" group, i.e., a group to be subjected to a more extensive search, i.e., one with a greater integration time, with an indication that the pilot is to be subjected to a shortened search window Ws centered on the previously detected strongest peak for the pilot (that is possible since a fix on the location of the strongest peak of the pilot has already been obtained). In one example, the size of the shortened window Ws is 16 chips, but it should be appreciated that other examples are possible, so this example should not be taken as limiting.

If the energy of the strongest peak, E(im), does not exceed the threshold T1n, control then passes to step 516. In step 516, the pilot is added to the deep group, but the default window size and placement (determined through the method of FIG. 5B) is retained since the strongest peak for the pilot has heretofore been undetectable.

From steps 510, 514, and 516, control then passes to step 520. In step 520, it is determined whether there are additional pilots that remain to be tested. If so, control passes to step 522, where one of these remaining pilots is selected. Control then passes to step 508 for another iteration. If no more pilots remain to be tested, control then passes to step 523.

In step 523, one or more of the pilots added to the deep group are subjected to a more extensive search, i.e., one with a greater integration time, using a search window dynamically determined for the pilot. If the pilot was added to the deep group in step 514, the size of the search window for the pilot is set to Ws, and the search window is positioned at the strongest peak previously detected for the pilot. If the pilot was added to the deep group in step 516, the size and position of the search window are set to the default values.

Note that step 523 need not be performed for all of the pilots in the deep group. In one implementation, step 523 is performed only in relation to those pilots which, in step 514, were added to the deep group and marked to be searched again with the shortened search window Ws, and a subset of those pilots which, in step 516, were added to the deep group with the original default window size retained.

From step 523, control passes to step 524. In step 524, one of the pilots searched in the previous step is selected. Control then passes to step 526. In step 526, the energy (Eim) of the strongest peak for the selected pilot is compared to two thresholds T2m and T2h. (FIG. 6, to be discussed farther on, illustrates an example setting of these thresholds.).

If the energy E(im) is less than T2m and greater than T2h, control passes to step 528. In step 528, the position of the earliest peak within a predetermined interval of the strongest peak that is not a sidelobe is recorded. (This step returns the position of the strongest peak if an earlier peak within a predetermined interval of the strongest peak and distinguishable from the sidelobes of the strongest peak is not detected.). The time of arrival, RMSE, and $E_c/I_0$ measurements for the pilot are also derived and recorded.

If the energy E(im) is not between T2m and T2h, control passes to step 530, where the energy E(im) is tested in relation to two thresholds T2h and T2n. (Again, FIG. 6, to be discussed farther on, illustrates an example setting of these thresholds.).

If the energy E(im) is not between these two thresholds, control passes to step 532, where a peak not found indication is recorded.

If the energy E(im) is between these two parameters, control passes to step 538, where the pilot is re-searched, i.e., the correlation function for the pilot redetermined using a shortened search window Ws centered on the previously detected earliest detectable peak for the pilot.

Step 540 is then performed. In step 540, the energy E(im) of the strongest peak resulting from the re-search is tested in relation to the thresholds T2m and T2n.

If the energy E(im) is between these two thresholds and the change in position of the strongest peak from the old search to the new search, i.e., the value |P(im)−P(imold)|, is less than a predetermined window Wr (which in on example is 4 chips), control passes back to step 528, where the position of the earliest peak within a predetermined interval of the strongest peak that is not a sidelobe is recorded. (Again, this step returns the position of the strongest peak if an earlier peak within a predetermined interval of the strongest peak and distinguishable from the sidelobes of the strongest peak is not detected.).

If, in step 540, the specified conditions are not met, control passes to step 532, where a peak not found indication is recorded.

From steps 528 and 532, control passes to step 534. In step 534, a determination is made whether any of the pilots that were searched in step 522 remain to be evaluated. If so, control passes to step 536, where one of these pilots is selected. Control then loops back to step 526, for another iteration. If no pilots remain, control passes to step 542, where the search cycle terminates.

Figure 6:
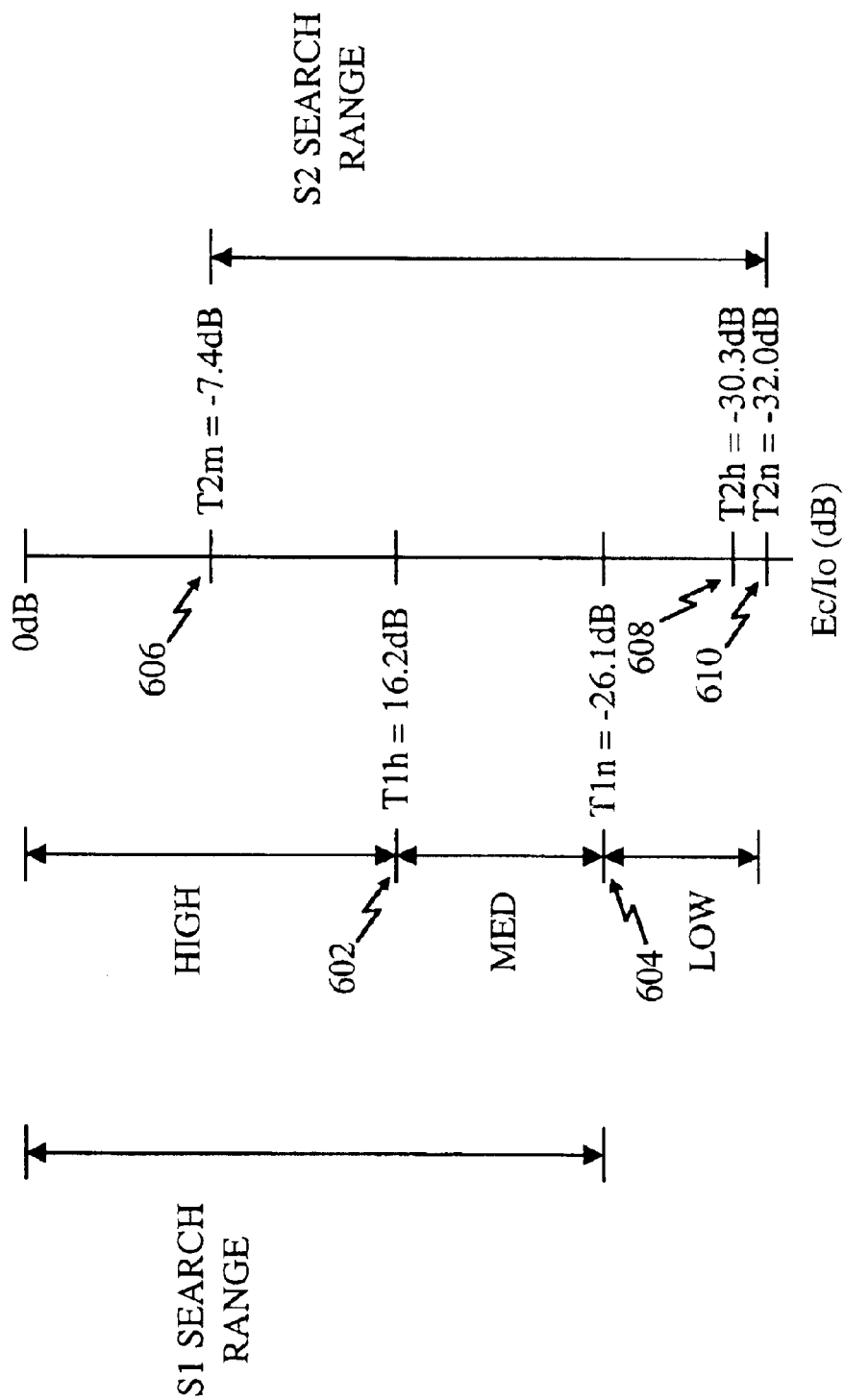
FIG. 6 is a diagram illustrating thresholds used in the example of FIG. 5A.

Referring to FIG. 6, an example setting of the thresholds T1h, T1n, T2m, T2h, and T2n, is illustrated. The threshold T1h is set to indicate when the existing results can be used to accurately estimate the desired parameters during the first portion of the search cycle illustrated in FIG. 5A (steps 502–522); the threshold T1n is set at the lower limit of the dynamic range of the estimator during this first portion; the thresholds T2m and T2n are, respectively, the upper and lower limits of the dynamic range of the estimator during the second portion of the search cycle illustrated in FIG. 5A (steps 523–542); and the threshold T2h is set to indicate when the existing results can be used to accurately estimate the desired parameters during this second portion of the search cycle.

In particular, the dynamic range of the parameter estimator for the initial portion of the search cycle (referred to as S1 in FIG. 6) ranges from an upper limit of 0 dB to a lower limit of −26.1 dB, while the dynamic range of the parameter estimator for the second portion of the search cycle (referred to as S2 in FIG. 6) ranges from an upper limit of −7.4 dB to a lower limit of −32.0 dB. The threshold T1h, identified with numeral 602, is set at −16.2 dB, while the threshold T1n, identified with numeral 604, is set at −26.1 dB, the lower limit of the dynamic range of the parameter estimator during the second portion of the search cycle. In addition, the threshold T2m, identified with numeral 606, is set at −7.4 dB, the upper limit of the dynamic range of the parameter estimator during the second portion of the search cycle. The threshold T2h, identified with numeral 608, is set at −30.3 dB, and the threshold T2n, identified with numeral 610, is set at −32.0 dB, the lower limit of the dynamic range of the parameter estimator during the second portion of the search cycle. Many other examples are possible, so this example should not be taken as limiting.

Figure 7:
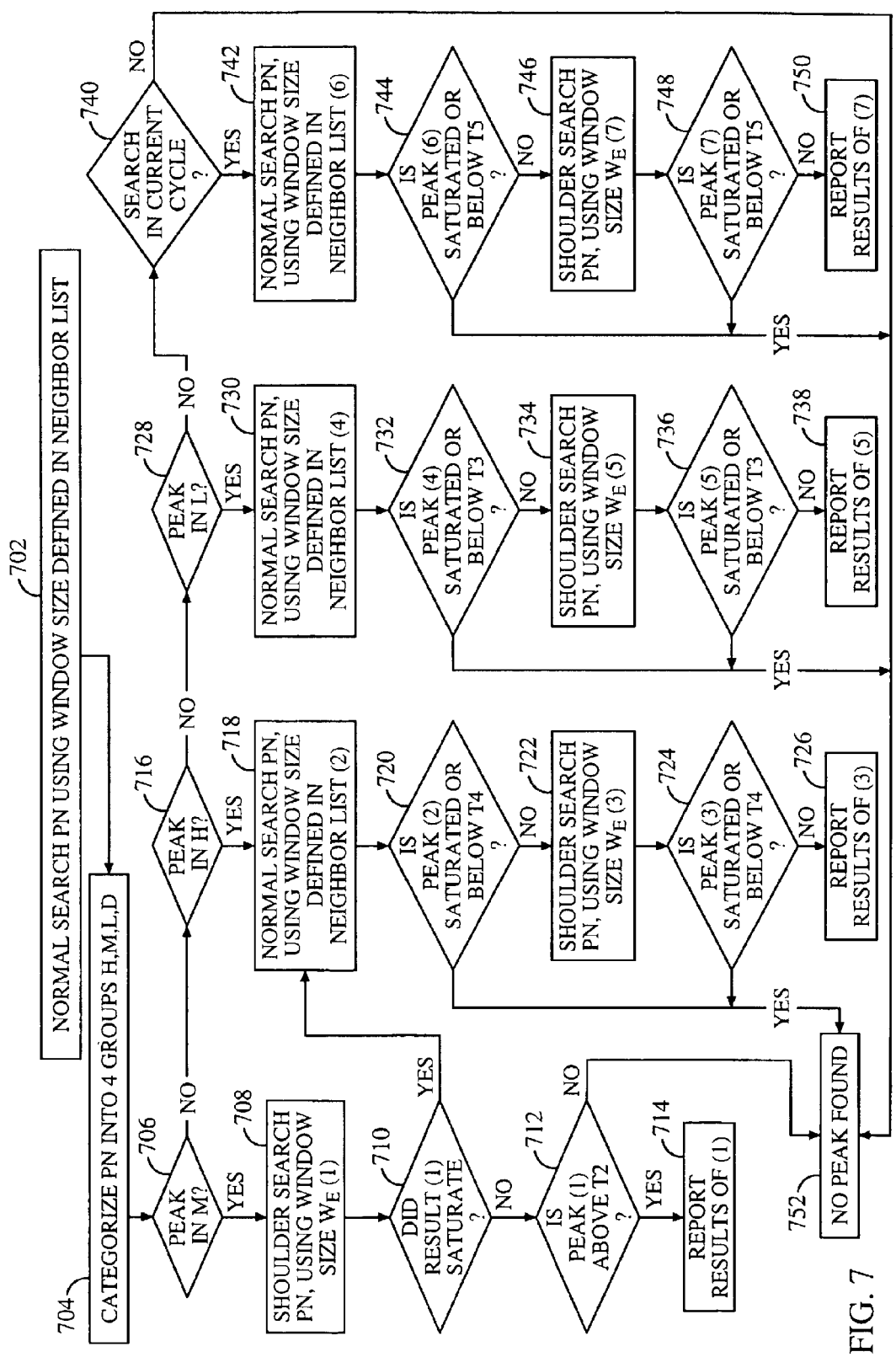
FIG. 7 is a flowchart of a second example of a method according to the invention of estimating a TOA parameter of a CDMA pilot signal using a dynamically variable search window.

Referring to FIG. 7, a flowchart of a second example of a method of performing the search cycle step 406 in the method of FIG. 4 is illustrated. In step 702, a "normal" search is conducted of one of the PNs in a group comprising the neighbor list plus the active PN, i.e., the pilot with which the subscriber station is currently registered and in communication with. A "normal" search is a search for the all of the peaks of the pilot in order to determine the coarse time of arrival of the earliest peak that is not a sidelobe of the strongest peak (which is the strongest peak if an earlier peak distinguishable from a sidelobe of the strongest peak is not detected), and is to be contrasted with a "shoulder" search, i.e., a search for the precise time of arrival of the specific earliest peak determined from the "normal" search. This normal search is performed using a search window having a size determined by the system for pilots in the neighbors list and centered at the first arriving usable multipath component.

Control then passes to step 704, where the results of the search are used to classify the pilot into one of four groups, a high (H) group, a medium (M) group, a low (L) group, and a deep (D) group. In one implementation, the pilot is classified within the H group if the peak for the pilot identified in step 702 saturated the estimator; the pilot is classified within the M group if the peak identified in step 702 is above a threshold T1 and did not saturate the estimator; the pilot is classified within the L group if the peak detected in step 702 is above a threshold T2 but below T1; and all other pilots are classified within the D group. (FIG. 9, described farther on, illustrates example settings of these thresholds.).

After step 704, control passes to step 706, where the peak identified for the pilot in step 702 is tested to determine if it is classified within the M group. If so, control passes to step 708, where a shoulder search is conducted using a window size $W_E$, which, in one non-limiting example, is 64 chips. Moreover, the search is biased toward the left of the location of the peak detected for the pilot in step 702. In particular, the search is conducted over $W_E$ chips beginning with the position of the earliest non-sidelobe peak+1.5−$W_E$.

From step 708, control then passes to step 710. In step 710, the results of the search conducted in step 708 are evaluated to determine if they caused the estimator to saturate. If so, control passes to step 718 (to be discussed later). If not, control passes to step 712.

In step 712, the peak resulting from step 708 is tested to determine if it is above a threshold T2. (FIG. 9, described father on, illustrates an example setting of this threshold.).

If the peak resulting from step 708 is above the threshold T2, control passes to step 714, where the position of the peak detected in step 708 is recorded along with corresponding measurements such as TOA, RMSE, and $E_c/I_0$. If the peak resulting from step 708 is not above the threshold T2, control passes to step 752, where an indication that no peak was found is recorded.

Turning back to step 706, if the peak detected for the pilot in step 702 is not classified within the M group, control passes to step 716, where it is determined whether the peak is classified within the H group. If so, control passes to step 718, where a normal search of the pilot is conducted using the search window size and position determined by the system for pilots on the neighbors list.

From step 718, control passes to step 720. In step 720, the peak resulting from step 718 is tested to determine if it resulted in saturation of the estimator or is below a threshold T4. (FIG. 9, described farther on, illustrates an example setting of this threshold.).

If the peak resulting from step 718 resulted in saturation or is below the threshold T4, control passes to step 752, where a peak not found indication is recorded. Otherwise, control passes to step 722, where a shoulder search of the pilot is conducted using the window size $W_E$. Moreover, the search is biased toward the left of the location of the peak for the pilot detected in step 718. In particular, the search is conducted over $W_E$ chips beginning with the position of the earliest non-sidelobe peak+1.5−$W_E$.

Control then passes to step 724, where the peak resulting from step 722 is tested to determine if it resulted in saturation of the estimator or if below the T4 threshold. If either of these conditions are met, control passes to step 752, where a peak not found indication is recorded. If both are unmet, control passes to step 726, where the position of the peak found in step 722 is recorded along with corresponding TOA, RMSE, and $E_c/I_0$ measurements.

Turning back to step 716, if the peak detected for the pilot in step 702 is not classified in the H group, control passes to step 728, where it is determined whether it is classified in the L group. If so, control passes to step 730, where a normal search of the pilot is performed using a search window size and position determined by the system for pilots in the neighbors list.

From step 730, control passes to step 732. In step 732, the peak resulting from step 730 is analyzed to determine if it resulted in saturation of the estimator, or is below a threshold T3. (FIG. 9, described father on, illustrates an example setting for this threshold.).

If the peak resulting from step 730 results in saturation of the estimator or is below the T3 threshold, control passes to step 752, where a peak not found indication is recorded. If neither of these conditions are satisfied, control passes to step 734, where a shoulder search of the pilot is conducted using the using the window size $W_E$. Moreover, the search is biased toward the left of the location of the peak for the pilot detected in step 730. In particular, the search is conducted over $W_E$ chips beginning with the position of the earliest non-sidelobe peak+1.5−$W_E$.

Step 736 is then performed. In step 736, a determination is made whether the peak resulting from step 734 resulted in saturation of the estimator or is below the T3 threshold. If so, control passes to step 752, where a peak not found indication is recorded. If not, control passes to step 738, where the position of the peak found in step 736 is recorded along with corresponding TOA, RMSE, and $E_c/I_0$ measurements.

Turning back to step 728, if the peak resulting from the search conducted in step 702 is not classified in the L group, control passes to step 740. In step 740, a determination is made whether there is still time in the current search cycle. If not, control passes to step 752, where a peak not found indication is recorded.

This step recognizes that, because of the long dwell times required for the pilots that are in the D group, it may not be possible to perform a search of all the pilots in this group within the current search cycle. Therefore, this step checks the time remaining in the current search cycle to determine if it can accommodate a search of the pilot. If insufficient time is available, a peak not found indication is recorded for the pilot, while, if sufficient time remains, the pilot is searched. In one alternative to this step, in order to allow limits to be placed on the length of the search cycle, only a predetermined number, e.g., 4, of the pilots in the D group are searched during a search cycle.

Assuming there is still time remaining in the current search cycle or the pilot is one of the members of the D group which is selected to be searched during the current search cycle, control passes to step 742. There, a normal search of the pilot is conducted using the search window size and position determined by the system for pilots in the neighbors list.

From step 742, control passes to step 744, where it is determined whether the peak resulting from step 742 results in saturation of the estimator or is below a threshold T5. (FIG. 9, described farther on, illustrates an example setting of this threshold.). If either of these conditions are met, control passes to step 752, where a peak not found indication is recorded. If both are unmet, control passes to step 746, where a shoulder search of the pilot is performed using the window size $W_E$. Moreover, the search is biased toward the left of the location of the peak for the pilot detected in step 702. In particular, the search is conducted over $W_E$ chips beginning with the position of the earliest non-sidelobe peak+1.5−$W_E$.

From step 746, step 748 is performed. In step 748, it is determined whether the peak resulting from step 748 results in saturation of the estimator or is below the T5 threshold. If either of these conditions are met, control passes to step 752, where a peak not found indication is recorded. If both are unmet, the position of the peak resulting from step 748 is recorded, as well as corresponding TOA, RMSE, and $E_c/I_0$ measurements.

The process of FIG. 7 may continue to iterate for each of the pilots in the group comprising the neighbor list and the active pilot.

Figure 9:
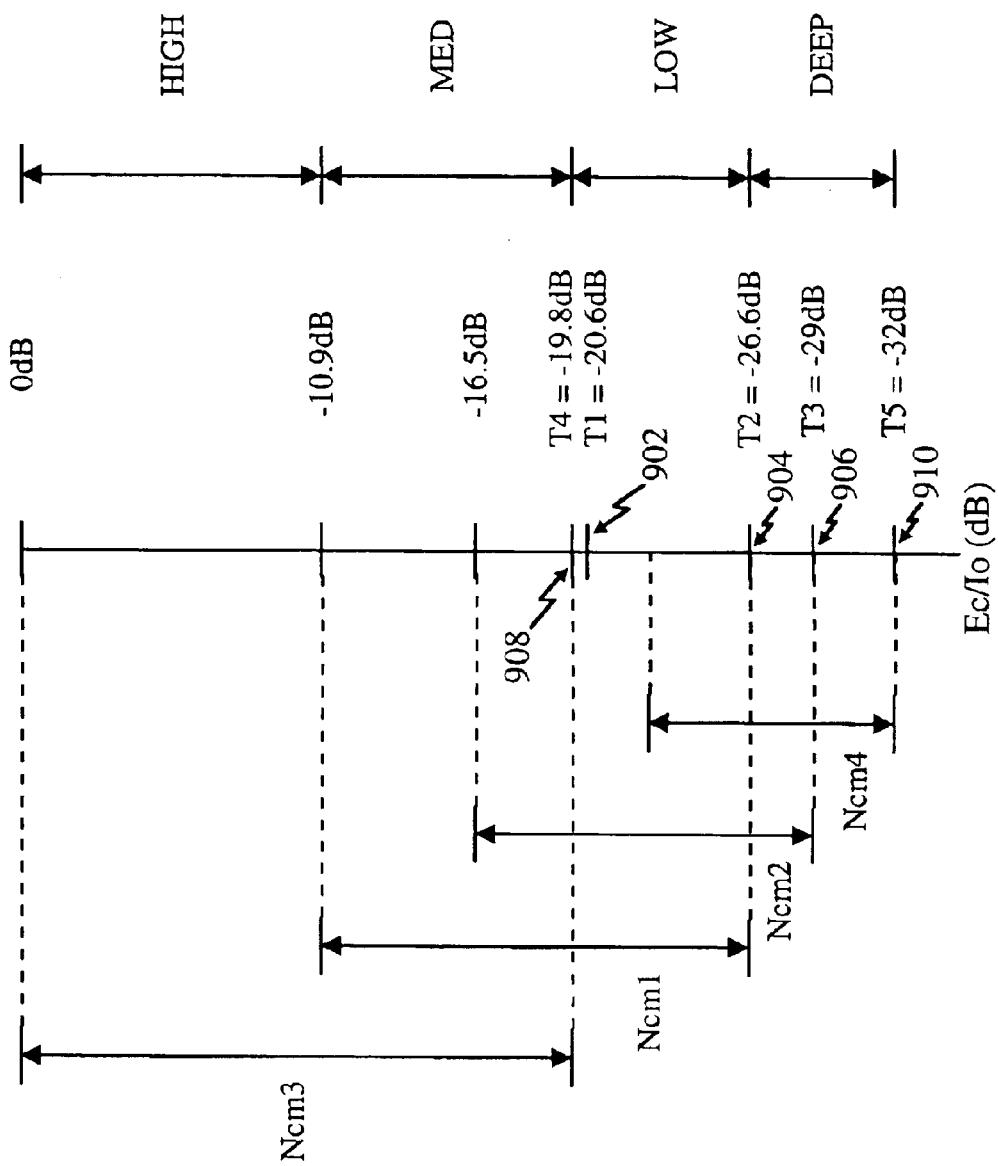
FIG. 9 is a diagram illustrating thresholds used in the example of FIG. 7.

Referring to FIG. 9, an example setting of the thresholds T1, T2, T3, T4, and T5 is illustrated. The threshold T1, identified with numeral 902, marks the boundary between the L and M groups; the threshold T2, identified with numeral 904, marks the boundary between the L and D groups, and is set to indicate when the parameter estimate(s) are accurate using the Ncm1 search parameters; the threshold T3, identified with numeral 906, is set to indicate when the parameter estimate(s) are accurate using the Ncm2 search parameters; the threshold T4, identified with numeral 908, is set to indicate when parameter estimate(s) are accurate using the Ncm3 search parameters; and the threshold T5, identified with numeral 910, is set to indicate when the parameter estimate(s) are accurate using the Ncm4 search parameters.

In particular, in the example illustrated, the threshold T1 is set to −20.6 dB; the threshold T2 is set to −26.6 dB; the threshold T3 is set to −29 dB; the threshold T4 is set to −19.8 dB; and the threshold T5 is set to −32 dB. However, it should be appreciated that other examples are possible, so that this example should not be construed as limiting.

Comparing the methods of FIGS. 5A and 7, it can be seen that the method of FIG. 5A involves limiting false alarm probabilities through the use of appropriately set thresholds, while that of FIG. 7 uses thresholds as well as a double detection criterion, whereby a pilot is subjected to both normal and shoulder searches, to avoid false alarms.

Any of the foregoing methods may be tangibly embodied in a variety of forms, including but not limited to, a form where a series of instructions embodying the method is stored on a processor readable medium or a server in a computer network including a public network such as the Internet or other TCP/IP network, or a private network, where the method is embodied as synthesized logic, or where the method is embodied as a computer program product, i.e., a code segment or module.

While various embodiments of the invention have been described, it will be apparent to those of ordinary skill in the art that many more embodiments and implementations are possible that are within the scope of this invention.

What is claimed is:

1. A parameter estimator comprising:
   correlation logic for determining a correlation function representing a correlation between a signal and at least one shifted version of an identification code within a search window;
   analysis logic for analyzing the correlation function and estimating, responsive thereto, at least one parameter relating to the signal; and
   logic for dynamically changing said search window after said analyzing based upon a priori information about said signal.

2. The parameter estimator of claim 1 wherein said logic for dynamically changing said search window is configured to dynamically determine a size and a position of the search window responsive to said a priori information regarding the signal.

3. The parameter estimator of claim 1 wherein the a priori information is provided from a source external to the estimator.

4. The parameter estimator of claim 1 wherein the a priori information is provided from a wireless communications system.

5. The parameter estimator of claim 1 wherein the a priori information relates to a previous search of the signal conducted by the parameter estimator.

6. The parameter estimator of claim 1 wherein the a priori information relates to general network characteristics.

7. The parameter estimator of claim 1 wherein the a priori information relates to an assumption that weaker signals occur later than stronger signals.

8. The parameter estimator of claim 1 wherein the identification code is a PN code.

9. The parameter estimator of any of claims 1 or 1 in a wireless communications device.

10. The parameter estimator of claim 1 wherein said logic is contained within a wireless communications device.

11. The parameter estimator of claim 1 configured to determine the position of the search window responsive to said priori information regarding the signal.

12. The parameter estimator of claim 1 configured to determine the size of the search window responsive to said a priori information regarding the signal.

13. A parameter estimator comprising:
   correlation means for determining a correlation function representing a correlation between a signal and at least one shifted version of an identification code within a search window;
   analysis means for analyzing the correlation function and estimating, responsive thereto, at least one parameter relating to the signal; and
   logic means for dynamically changing of said search window after said analyzing based upon a priori information about said signal.

14. A method of estimating at least one parameter of a signal using a dynamically variable search window comprising:
   determining a correlation function representing a correlation between the signal and at least one shifted version of an identification code within the dynamically variable search window;
   estimating, responsive to the correlation function, at least one parameter relating to the signal and
   changing said dynamically variable search window after said estimating responsive to a priori information regarding said signal.

15. The method of claim 14 wherein the signal is a pilot signal.

16. The method of claim 14 wherein the identification code is a PN code.

17. The method of claim 14 wherein the at least one parameter relating to the signal include a time of arrival (TOA) parameter.

18. The method of claim 17 wherein the at least one parameter relating to the signal includes a root mean squared error (RMSE) for the TOA parameter.

19. The method of claim 14 wherein the at least one parameter for the signal includes an $E_c/I_0$ parameter.

20. The method of claim 14 wherein a size and a placement of the search window are dynamically set responsive to said a priori information regarding the signal.

21. The method of claim 14 wherein the a priori information is provided from a wireless communications system.

22. The method of claim 14 wherein the a priori information is provided from a previous search of the signal.

23. The method of claim 14 wherein the a priori information relates to general network characteristics.

24. The method of claim 14 wherein the a priori information relates to an assumption that weaker signals arrive later than stronger signals.

25. The method of claim 14 wherein a size of the search window is set responsive to said a priori information regarding the signal.

26. The method of claim 14 wherein a placement of the search window is set responsive to said a priori information regarding the signal.

27. A method of estimating one or more parameter(s) of a signal using a dynamically variable search window comprising:
   determining, using a first search window, a first correlation function representing the correlation between a signal and one or more shifted versions of an identification code within the first search window;
   attempting to estimate, responsive to the first correlation function, one or more parameter(s) relating to the signal; and
   if the attempt is unsuccessful:
      determining, using a second search window which differs from the first search window, a second correlation function representing the correlation between the signal and one or more shifted versions of the identification code within the second search window; and
      attempting to estimate, responsive to the second correlation function, the one or more parameter(s) relating to the signal.

28. The method of claim 27 wherein the signal is a pilot signal.

29. The method of claim 27 wherein the identification code is a PN code.

30. The method of claim 27 wherein a size of the second search window is smaller than that of the first search window.

31. The method of claim 27 wherein a size of the second search window is larger than that of the first search window.

32. The method of claim 27 wherein the position of the second search window is different from that of the first search window.

33. The method of claim 27 wherein the one or more parameter(s) include a time of arrival (TOA) parameter for the signal.

34. The method of claim 27 wherein the one or more parameter(s) include a root mean squared error (RMSE) for the TOA parameter.

35. The method of claim 27 wherein the one or more parameter(s) include an $E_c/I_0$ parameter relating to the signal.

36. The method of claim 27 further comprising iterating until the one or more parameter(s) are estimated, or it is determined that the one or more parameter(s) cannot be estimated from the signal.

37. A method of estimating at least one parameter of a signal using a dynamically variable search window comprising:

a step for dynamically determining, responsive to a priori information regarding a signal, a size of a search window a step for determining a correlation function representing a correlation between the signal and at least one shifted version of an identification code within the dynamically determined search window; and a step for estimating, responsive to the correlation function, one or more parameter(s) relating to the signal; and a step for changing the size of said variable search window after said estimating, based upon a priori information regarding said signal.

38. A method of estimating one or more parameters of a signal using a dynamically variable search window comprising:

a step for determining, using a first search window, a first correlation function representing the correlation between a signal and one or more shifted versions of an identification code within the first search window;

a step for attempting to estimate, responsive to the first correlation function, one or more parameter(s) relating to the signal; and if the attempt is unsuccessful:

a step for determining, using a second search window which differs from the first search window, a second correlation function representing the correlation between the signal and one or more shifted versions of the identification code within the second search window; and a step for attempting to estimate, responsive to the second correlation function, the one or more parameter(s) relating to the signal.

39. The methods of any of claims 14, 27, 37 or 38, tangibly embodied as a series of instructions stored in a processor readable medium.

40. The methods of any of claims 14, 27, 37 or 38, tangibly embodied as a series of instructions stored on a server.

41. A position determining device, comprising:

apparatus for acquiring a signal within a search window of first size for use in determining a position; and logic for dynamically changing said search window to a second size after said acquiring, based upon a priori information about said acquired signal.

42. The position determining device of claim 41 wherein said logic for dynamically changing said search window is configured to determine a position of the search window of second size based on said a priori information.

43. The position determining device of claim 41 wherein the a priori information is provided from a source external to the device.

44. The position determining device of claim 41 wherein the a priori information is provided from a wireless communications system.

45. The position determining device of claim 41 wherein the a priori information relates to a previous search of the signal.

46. The position determining device of claim 41 wherein the a priori information relates to general network characteristics.

47. The position determining device of claim 41 wherein the a priori information relates to an assumption that weaker signals occur later than stronger signals.

48. The position determining device of claim 41 wherein the signal contains an identification code.

49. The position determining device of claim 48 wherein said identification code is a PN code.

50. The position determining device of claim 41 wherein said apparatus and said logic are contained in a wireless communications device.

51. A method for determining a position, comprising:

acquiring a signal within a search window of first size for use in determining a position; and dynamically changing said search window to a second size, based upon a priori information about said acquired signal.

52. The method of claim 51 further comprising determining a position of the search window of second size based on said a priori information.

53. The method of claim 51 wherein the a priori information is provided from a wireless communications system.

54. The method of claim 51 wherein the a priori information relates to a previous search of the acquired signal.

55. The method of claim 51 wherein the a priori information relates to general network characteristics.

56. The method of claim 51 wherein the a priori information relates to an assumption that weaker signals occur later than stronger signals.

57. The method of claim 51 wherein the signal contains an identification code.

58. The method of claim 57 wherein said identification code is a PN code.

* * * * *

UNITED STATES PATENT AND TRADEMARK OFFICE
CERTIFICATE OF CORRECTION

PATENT NO. : 6,738,438 B2  Page 1 of 1
APPLICATION NO. : 10/056877
DATED : May 18, 2004
INVENTOR(S) : Roland R. Rick et al.

It is certified that error appears in the above-identified patent and that said Letters Patent is hereby corrected as shown below:

Claim 11 (column 17 line 59) change "said priori information" to --said a priori information--.

Claim 37 (column 19 line 31) change "a size of a search window" to --a size of a search window;--.

Claim 37 (column 19 line 35) change "determined search window; and" to --determined search window;--.

Signed and Sealed this

Third Day of February, 2009

JOHN DOLL
*Acting Director of the United States Patent and Trademark Office*